United States Patent [19]

Holub et al.

[11] 4,258,155

[45] Mar. 24, 1981

[54] BLENDS OF POLYETHERIMIDES AND POLYAMIDEIMIDES

[75] Inventors: Fred F. Holub, Schenectady, N.Y.; Gary A. Mellinger, Louisville, Ky.

[73] Assignee: General Electric Company, Schenectady, N.Y.

[21] Appl. No.: 99,931

[22] Filed: Dec. 3, 1979

[51] Int. Cl.³ .............................................. C08L 79/08
[52] U.S. Cl. .................................... 525/431; 525/436
[58] Field of Search ............................... 525/436, 431

[56] References Cited

U.S. PATENT DOCUMENTS

| | | | |
|---|---|---|---|
| 3,342,897 | 9/1967 | Abramo | 525/436 |
| 3,702,738 | 11/1972 | Haller | 525/436 |
| 4,142,870 | 3/1979 | Lovejoy | 525/436 |

Primary Examiner—Paul Lieberman
Attorney, Agent, or Firm—Joseph T. Cohen; James C. Davis, Jr.

[57] ABSTRACT

Blends of polyetherimides and polyamideimides have been found to be useful in the coating and molding arts.

7 Claims, No Drawings

BLENDS OF POLYETHERIMIDES AND POLYAMIDEIMIDES

This invention is concerned with blends of polyamideimides (PAI) and polyetherimides (PEI) useful in the coating and molding arts. More particularly the invention is concerned with a blend comprising by weight (a) from 5 to 95% of a polyamideimide comprising essentially chemically combined units of the formula

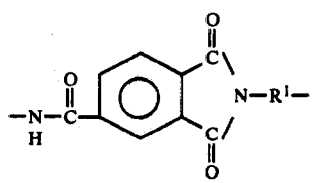

and (2) from 95 to 5% of a polyetherimide comprising essentially chemically combined units of the formula

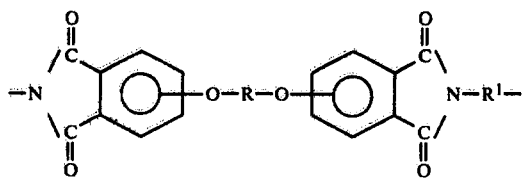

where R is a member selected from the class consisting of (a) the following divalent organic radicals:

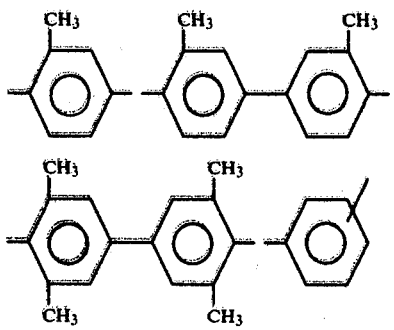

and 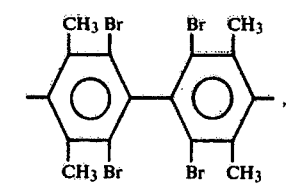

and (b) divalent organic radicals of the general formula,

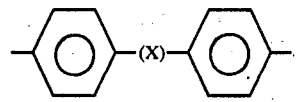

where X is $-C_yH_{2y}-$, y is a whole number equal to from 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula,

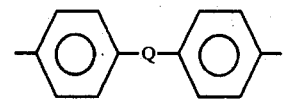

where Q is a member selected from the class consisting of

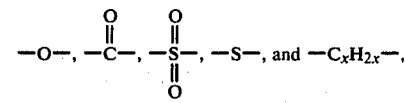

and x is a whole number equal to from 1 to 5, inclusive.

Polyamideimides are known to have good chemical resistance and moderate heat resistance. Although such polyamideimides can be dissolved in suitable solvents for coating applications, such polyamideimides are quite difficult to mold and require excessive temperatures and pressures in the molding cycle. Polyetherimides are known to have good high temperature characteristics and are more amenable to viable molding cycles; however, it would be advantageous to upgrade the chemical resistance of these polyetherimides and reduce their cost for molding and coating applications.

We have unexpectedly discovered that blends of polyamideimides of formula I and polyetherimides of formula II over a wide range can be made in which the properties of the blend show a marked average improvement over the properties of the components of these blends, and in some instances the improvement in properties are unexpected considering the proportion of either the polyamideimide or the polyetherimide used. By making the above-described blends, the utility for both these members in the blend can be considerably expanded. In addition, by blending the polyamideimide with polyimides, products can be obtained which are lower in cost than is usually associated with the use of the polyetherimides alone without significant sacrifice (if any) in properties.

The polyetherimides which are employed in the present invention can be made in accordance with the disclosures and teachings in U.S. Pat. No. 3,847,867 issued Nov. 12, 1974 in the names of Darrell R. Heath and Joseph G. Wirth and assigned to the same assignee as the present invention. The polyamideimides employed in the practice of the instant invention can be made in accordance with the disclosures and teachings in U.S. Pat. No. 3,972,902 issued Aug. 3, 1976. By reference both these patents are made part of the disclosures and teachings of the instant application.

A preferred class of polyetherimides which are included by formula (II) are polymers consisting essentially of from about 2 to 5000 or more units and preferably from 5 to 100 units of the formula

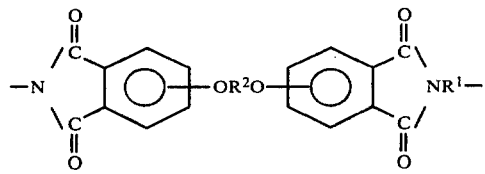

where R¹ is previously defined, and R² is

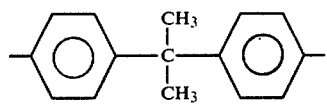

Included by the polyetherimides of formula II, are polymers consisting essentially of the following chemically combined units,

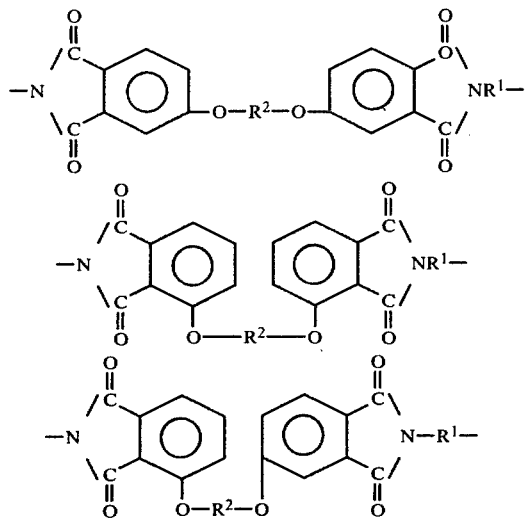

and mixtures thereof, where R¹ and R² are defined above.

The polyetherimides of formulas II-VI can be made by effecting reaction between an aromatic bis(etheranhydride) of the general formula,

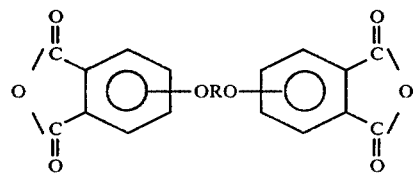

and an organic diamine of the general formula,

   VIII.

where R and R¹ are as previously defined.

There can be employed from 0.95 to 1.05 mols of aromatic bis(etheranhydride) per mol of organic diamine. It is preferred to employ substantially equal molar amounts of bisanhydride and diamine.

The polyamideimides employed in the present invention (which can have from 10 to 5000 or more units of formula I) can be prepared from acyl halide derivatives of trimellitic anhydride. The acyl halide derivative from trimellitic anhydride (1,2,4-benzene tricarboxylic acid anhydride) having at least one acyl halide and that in the 4-ring position, include derivatives, such as the 4-acid chloride 1,4- and 2,4-diacid chloride. The bromide and other reactive halide derivatives are also suitable. The acyl halide derivative is reacted with an aromatic diamine having one or more aromatic rings and two primary amino groups corresponding to general formula VIII.

In making the polyetherimides, there are employed from 0.95 to 1.05 mols of the aromatic dianhydride of formula VII per mol of the organic diamine of formula VIII. Preferably, one can employ equal or lower amounts of the bisanhydride and diamine.

In making the polyamideimide, again one can employ from 0.95 to 1.05 mols of the trimellitic anhydride derivative of the formula, for example,

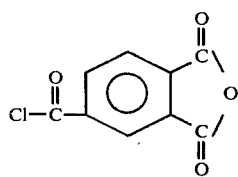

per mol of organic diamine of formula VIII. Preferably one employs substantially equal molar amounts of the trimellitic anhydride derivative of formula IX and the organic diamine.

Chain stoppers such as aniline or mono-organic acid derivatives or monoanhydrides may be used in making either the polyamideimide or polyetherimide.

Generally either the polyetherimide or the polyamideimide can be obtained by effecting the reaction between the chosen organic diamine and the particular dianhydride or monoanhydride in the presence of a dipolar aprotic organic solvent under ambient conditions to produce a polyamide acid. In both instances, upon further heating the polyamide acids convert to the imidized state comprising the units of formulas I and II. Depending upon the solids content of the polyamide acid solution, reaction can be completed in from 0.5 to 2 hours or more. Upon completion of the reaction, the solution can be cast on a substrate so that evaporation of the organic solvent occurs. By heating at temperatures of from 150°-200° C. or higher one converts the polyamide acid of each polymeric member of the blend to the polyimide state, so that the blend at this point has good heat resistance, chemical resistance such as solvent resistance, and moldability if the desired use of these blends is in molding applications. Such blends are particularly useful as wire coating enamels and impart solvent resistance and heat resistance properties to various substrates.

The aromatic bis(etheranhydride) of formula VII shown in the above-mentioned U.S. Pat. No. 3,847,867, can be prepared from the hydrolysis followed by dehydration of the reaction product of the nitrosubstituted phenyl dinitrile and then reaction with a dialkali metal salt of a dihydric aryl compound in the presence of a dipolar aprotic solvent, where the alkali metal salt has the general formula Alk-O-R¹-O-Alk   X.

where $R^1$ has the meanings given above and preferably is the same as $R^2$ and Alk is an alkali metal ion. Various well known procedures can be used to convert the resulting tetranitriles to the corresponding tetracids and dianhydrides.

Included among the alkali metal salts of the above described dihydric phenols are sodium and potassium salts of the following dihydric phenols:
2,2-bis-(hydroxyphenol)propane;
2,4'-dihydroxydiphenylmethane;
bis-(2-hydroxyphenyl)-methane;
2,2-bis-(4-hydroxyphenyl)-propane hereinafter identified as "bisphenol-A" or "BPA;"
1,1-bis-(4-hydroxyphenyl)-ethane;
1,1-bis-(4-hydroxyphenyl)-propane
3,3-bis-(4-hydroxyphenyl)-pentane;
4,4'-dihydroxybiphenyl;
4,4'-dihydroxy-3,3',5,5'-tetramethylbiphenyl;
2,4-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

Included by the organic diamines of formula VII are, for example,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminoaphthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
nonamethylenediamine; 2,6-diaminotoluene;
bis-(3-aminopropyl)tetramethyldisiloxane, etc.

The polyetherimide-polyamideimide blend can be reinforced with various particulated fillers such as glass fibers, silica, fillers, carbon whiskers, up to 50% or more, by weight, of the total blend.

In order that those skilled in the art may better understand how the present invention may be practiced, the following examples are given by way of illustration and not by way of limitation. All parts are by weight unless otherwise indicated.

EXAMPLE 1

This example illustrates a method which has been used for the preparation of the polyetherimide. Other means for making such imides and use of various substituted ingredients such as diamino compounds or the dianhydride are described in the above-mentioned U.S. Pat. No. 3,847,867.

A mixture of 4,4'-methylenedianiline (37.344 parts) and 2,3-bis[4-(2,3-dicarboxyphenoxy)phenyl]propane dianhydride (100 parts), orthodichlorobenzene (1300 parts) and toluene (50 parts) was stirred and heated to reflux for five hours under a nitrogen atmosphere. In the course of the reaction, water formed was removed by azeotropic distillation. Upon cooling, the reaction mixture was poured into methanol to isolate the polymer. The yield was 134.7 parts. The intrinsic viscosity was 0.41 dl./g. in dimethylformamide. The glass transition temperature was 237° C. as determined by thermal optical analysis. The elemental analysis found was: C, 77.8%, H, 4.5%; N, 4.1%. Calculated for $(C_{44}H_{30}N_2O_6)_n$ is C, 77.4%; H, 4.4%; N, 4.1%.

By this method of preparation a polyetherimide is obtained having the formula

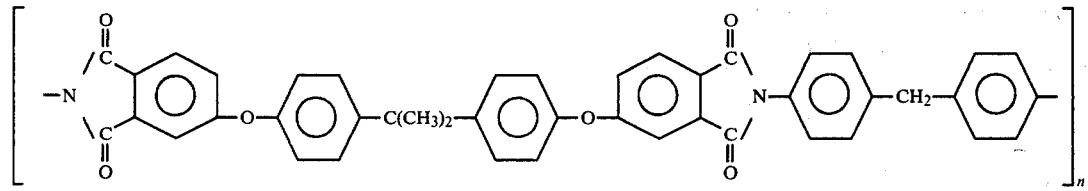

where n is a positive integer greater than 1.

EXAMPLE 2

A polyamideimide used in making the blends of our invention can be prepared in accordance with the disclosures and teachings in the aforesaid U.S. Pat. No. 3,573,260. More particularly, following the directions of this patent (Example 1), a reaction vessel equipped with a nitrogen purge is charged with 6,055 parts dimethylacetamide and 1,670 parts methylene dianiline

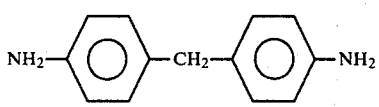

XII.

The mixture is stirred for about 10 minutes after 1,775 parts of the 4-acid chloride of trimellitic anhydride (formula IX) is added over a period of 4 hours while maintaining a temperature of around 50° C. throughout the addition of the trimellitic anhydride acid chloride. The mixture is then heated at 50° C. for an additional 2–4 hours after which the resulting polymer can be precipitated by well known means. The polymer is advantageously washed to remove hydrochloric acid and then centrifugred to remove excess water. Thereafter the polymer is dried, e.g., with a rotary drum drier at about 150° C., to give a polyamideimide of the formula

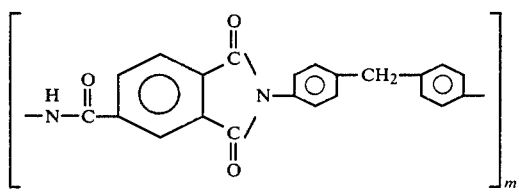

where m is a whole number greater than 1.

EXAMPLE 3

In this example, a polyetherimide (PEI) of formula XI (prepared as in Example 1), and a polyamideimide (PAI) of formula XIII (prepared as in Example 2) were mixed in various proportions by dissolving the two polymers in a sufficient amount of N-methylpyrrolidone at about 150° C. This yielded a clear solution which when cooled to room temperature gave a homogeneous solution. Evaporation of the solvent yielded a clear yellow film which was difficult to scratch. In other tests, the two solid polymers were blended at 315° C. for ten minutes and thereafter the polymer mixture was cooled to room temperature and compression-molded at 320°–330° C. for 10 minutes into thin sheets. The following Table I shows the physical properties of mixtures of the polymers blended at the elevated temperatures and then molded using varying amounts of either the polyetherimide or of the polyamideimide.

TABLE I

| Parts by Weight of Polymer Ingredients | | Tensile Strength, Psi | | Percent Elongation |
|---|---|---|---|---|
| PEI | PAI | Yield | Ultimate | Ultimate |
| 100 | 0 | 12,300 | 11,400 | 19.3% |
| 75 | 25 | 12,500 | 11,100 | 20.9% |
| 60 | 40 | 14,600 | 13,300 | 16.8% |
| 50 | 50 | — | 13,700 | — |
| 25 | 75 | 11,800 | 10,800 | 15.5% |
| 0 | 100 | Difficult to Mold | | |

It will be apparent from an examination of Table I that with the exception of the test which was carried out on the polyamideimide itself which was not moldable at the specified conditions, unexpectedly the tensile and elongation properties of the blends were quite close despite the varying amounts of polyetherimide and polyamideimide present in the blend. It is particularly unexpected to find that whereas the 100% polyamideimide was not moldable under the conditions of this test, all the other blends, even those having significant amounts of the polyamideimide were moldable and in fact the physical properties were quite comparable to those of the molded 100% polyetherimide. Finally, it is found that in the case of each blend, the solvent resistance, whether in film form or in the molded state, is enhanced.

EXAMPLE 4

2.1 gm of trimellitic acid chloride (TMAC) and 1.98 gm of 4,4'-methylene dianiline of formula XII was mixed with 15 cc of N-methylpyrrolidone. After stirring, this mixture exothermed to 59° C. to give a clear polymeric amic acid amide identified as solution A.

In another reaction vessel 5.2 g of 2,2-bis[4-(2,3-dicarboxyphenoxy)phenyl]propane and 1.98 gm of methylenedianiline were mixed with 15 cc of N-methylpyrrolidone to yield after exotherming to 64° C., a clear polymeric amic acid amide identified as solution B.

9.5 gm of polymer solution A was mixed with 11.1 gms of solution B at room temperature and the mixture was stirred until it was homogeneous. From this solution blend a film was cast at 280°–300° C. yielding an imidized polymer film containing blends of polyamideimide and polyetherimide which had good abrasion resistance.

EXAMPLE 5

2.1 gm of TMAC and 2.48 gm of 4,4'-diaminodiphenyl sulfone in 15 cc N-methylpyrrolidone was stirred to yield after exotherming to 38° C., a clear polymeric amic acid amide identified as solution A.

In another reaction vessel, 5.2 g of 2,2-bis[4-(2,3-dicarboxyphenoxy)phenyl]propane and 2.48 gm of the same diaminodiphenyl sulfone were mixed with 15 cc N-methylpyrrolidone, to yield after exotherming to 37° C., a clear polymeric amic acid amide identified as solution B.

While stirring, 9.8 gm of polymeric solution A was blended with 11.4 gms of solution B at room temperature until the mixture was homogeneous. From this solution blend a film was cast at 280°–300° C. yielding an imidized polymer film containing blends of polyamideimide and polyetherimide having good abrasion resistance.

EXAMPLE 6

2.1 gm of TMAC and 2.0 gm of 4,4'oxydianiline in 15 cc of N-methylpyrrolidone was stirred to yield, after exotherming to 63° C., a clear polymeric amic acid amide identified as solution A.

In another reaction vessel, 5.2 g of 2,3-bis[4-2,3-dicarboxyphenoxy)phenyl]propane and 2.0 gm of 4,4'oxydianiline were stirred in 15 cc N-methylpyrrolidone to yield, after exotherming to 61° C., a clear polymeric amic acid amide identified as solution B.

9.6 gm of polymeric solution A was blended with stirring with 11.1 gms of polymeric solution B at room temperature until the mixture was homogeneous. From this solution blend a film was cast at 280°–300° C. yielding an imidized polymer film containing blends of polyamideimide and polyetherimide having good abrasion resistance.

EXAMPLE 7

2.1 gm of TMAC and 1.08 gm of m-phenylenediamine in 15 cc N-methylpyrrolidone was stirred to yield, after exotherming to 43° C., a clear polymeric amic acid amide identified as solution A.

In another reaction vessel, 5.2 g of 2,3-dicarboxyphenoxy)phenyl]propane and 1.08 gm of m-phenylenediamine were stirred in 15 cc of N-methylpyrrolidone, to yield after exotherming to 41° C., a clear polymeric amic acid amide, identified as solution B.

9.1 gm of polymeric solution A was blended with stirring with 10.7 gms of polymeric solution B at room temperature until the mixture was homogeneous. From this solution blend, a film was cast at 280°-300° C. yielding an imidized polymeric film containing blends of polyamideimide and polyetherimide having resistance to abrasion.

EXAMPLE 8

2.1 gm of TMAC and 1.08 gm m-phenylenediamine placed in 15 cc of N-methylpyrrolidone was stirred to yield, after exotherming to 43° C., a clear polymeric amic acid amide identified as solution A.

In another reaction vessel, 5.2 g of 2,2-bis[4-(2,3-dicarboxyphenoxy)phenyl]propane and 1.98 gm of 4,4'-methylenedianiline were stirred in 15 cc N-methylpyrrolidone, to yield after exotherming to 64° C., a clear polymeric amic acid amide identified as solution B.

9.1 gms of polymeric solution A was blended with stirring with 11.1 gms of polymeric solution B at room temperature until the mixture was homogeneous. From this solution blend, a film was cast at 280°-300° C. yielding an imidized polymer film containing blends of polyamideimide and polyetherimide.

The Tg's of the blends in Examples 4-8 (with the solvent removed) were determined as were the Tg's for the 100% PEI and 100% PAI described in Example 7. The following Table II showed the results of these tests. It will be noted from Table II that unexpectedly the Tg's, as exemplified by the results in Example 7, instead of being an average of the Tg's of the homopolymers were considerably below the Tg's of the homopolymers indicating the unexpected and unobvious results obtainable by blending polyetherimides with polyamideimides. The reduction in Tg's (which measures the degree of softening) improves the moldability of the blends of the instant invention.

TABLE II

| Example Number Blend | Tg |
| --- | --- |
| 4 | 203° C. |
| 5 | 161° C. |
| 6 | — |
| 7 | 147° C. |
| 7a (100% PEI) | 220° C. |
| 7b (100% PAI) | 241° C. |
| 8 | 203° C. |

It will of course be apparent to those skilled in the art that in addition to the diamino compounds used in making the above blends, other diamino compounds, many examples of which have been recited previously, can be used instead. In the same manner, in addition to the bisphenol-A dianhydride employed in the examples in this application. Other dianhydrides, many examples of which have been given above, can be employed to make other types of polyetherimides. Finally, the proportions of the polyamideimide and the polyetherimide in the blend can be varied widely within the range previously described without departing from the scope of the invention.

In addition to the two resins comprised in the blend above, other polymers and resins in amounts ranging from 1 to 50% or more, by weight, based on the total weight of the blend of polyamideimide and polyetherimide resins may also be used. Among such polymers may be added, for instance, polyolefins, polystyrene, polyphenylene oxides, such as shown in U.S. Pat. No. 3,306,875, epoxy resins, polycarbonate resins, such as shown in U.S. Pat. No. 3,028,365, silicone resins, polyarylene polyethers such as shown in U.S. Pat. No. 3,329,909, etc. many of which are well known in the art.

The compositions of the present invention have application in a wide variety of physical shapes and forms, including their use as films, molding compounds, etc. The heat stability and resistance to deformation at elevated temperature, while at the same time retaining their properties at elevated temperatures in the imidized state, make these compositions quite useful. When used as films or when made into molded products, these polymers including the laminated products prepared therefrom not only possess good physical properties at room temperature but they retain their strength and excellent response to workloading at elevated temperatures for long periods of time. These blend compositions resist fusion when exposed to elevated temperatures, for extended periods of times while still retaining an exceptionally high proportion of their room temperature physical properties.

Films formed from the polymeric blends of this invention may be used in applications where films have been used previously. They serve effectively in an extensive variety of wrapping and packaging applications. Thus, the compositions of the present invention can be used in automobile and aviation applications for decorative and protective purposes, and as high temperature electrical insulation for motor slot liners, in transformers, and as dielectric capacitors.

Alternatively, solutions of the curable compositions herein described can be coated on electrical conductors such as copper, aluminum, etc. and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc.

Applications which recommend these resins include their use as binders for asbestos fibers, carbon fibers, and other fibrous materials in making brakelinings. In addition, grinding wheels and other abrasive articles can be made from such resins by incorporating abrasive grains such as alundum, carborundum, diamond dust, etc., and shaping or molding the mixture under heat and pressure to obtain the desired condiguration and shape for grinding and abrasive purposes.

What we claim as new and desire to secure by Letters Patent of the United States:

1. A polymeric blend comprising, by weight, (a) from 5 to 95% of a polyamideimide comprising essentially chemically combined units of the formula

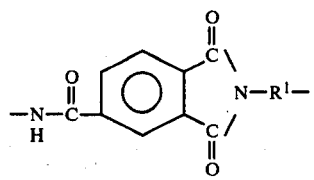

and (2) from 95% to 5% of a polyetherimide comprising essentially chemically combined units of the formula

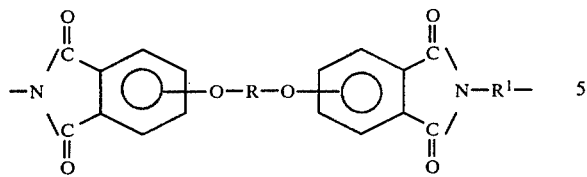

where R is a member selected from the class consisting of (a) the following divalent organic radicals:

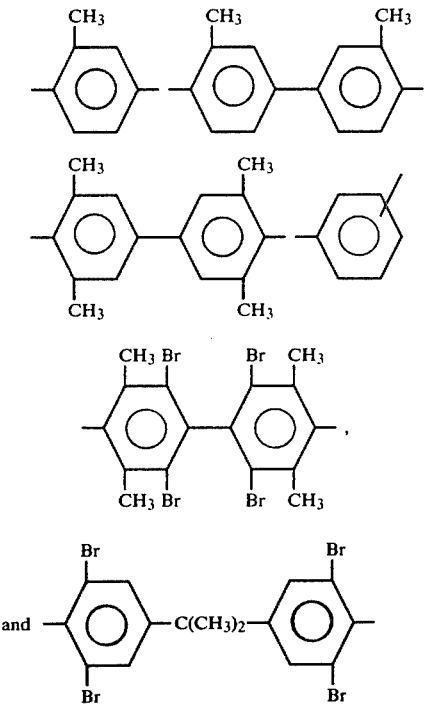

and (b) divalent organic radicals of the general formula,

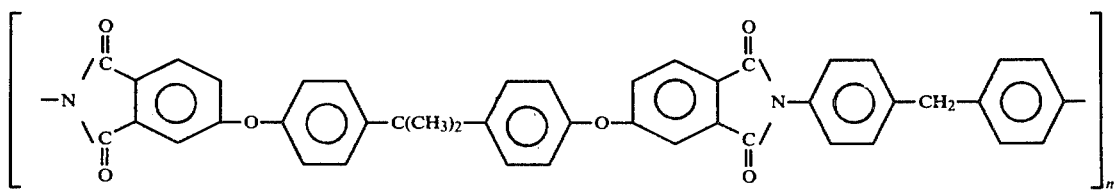

where X is —$C_yH_{2y}$—, y is a whole number equal to from 1 to 5 inclusive and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxane, and (d) divalent radicals included by the formula, $$-\bigcirc-Q-\bigcirc-$$

where Q is a member selected from the class consisting of $$-O-,\ -\overset{O}{\underset{}{C}}-,\ -\overset{O}{\underset{O}{S}}-,\ -S-,\ \text{and}\ -C_xH_{2x}-,$$

and x is a whole number equal to from 1 to 5 inclusive.

2. A composition as in claim 1 wherein the polyimide member has the formula
where n is a whole number greater than 1.

3. The composition as in claim 1 wherein the polyamideimide is the product of reaction of trimellitic acid chloride and 4,4'-methylene dianiline.

4. A composition as in claim 1 wherein the polyamideimide is the product of reaction of trimellitic acid chloride acid and 4,4'-diaminodiphenyl sulfone.

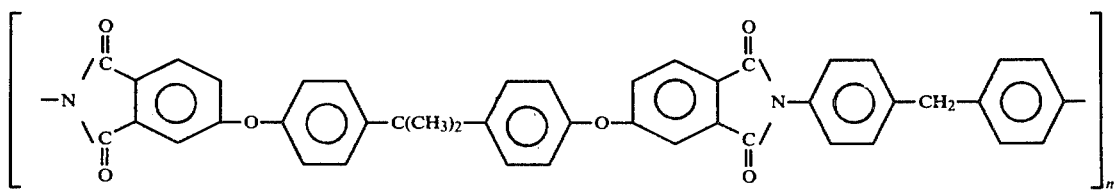

5. A composition as in claim 1 wherein the polyamideimide is the product of reaction of trimellitic acid chloride and 4,4'-oxydianiline.

6. A composition as in claim 1 wherein the polyamideimide is the product of reaction of trimellitic acid chloride and m-phenylenediamine.

7. A composition of matter comprising, by weight, (a) from 95% to 5% of a polyimide resin of the formula

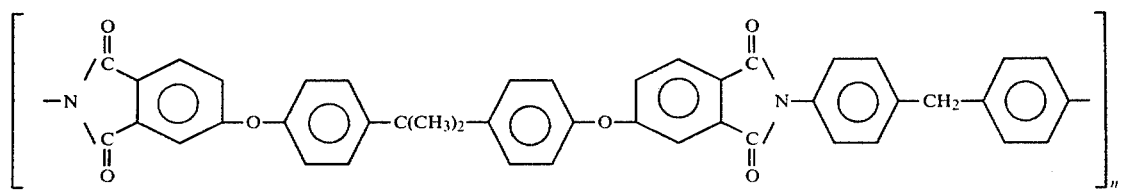

where n is a positive integer greater than 1 and (b) from
95% to 5% of a polyamideimide of the formula
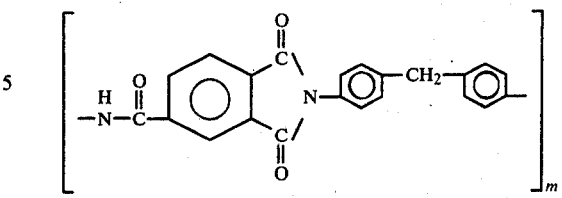
where m is a positive integer greater than 1.
* * * * *